United States Patent
Yoshikawa et al.

(10) Patent No.: US 7,119,798 B2
(45) Date of Patent: Oct. 10, 2006

(54) DIGITIZING TABLET

(75) Inventors: Osamu Yoshikawa, Tokyo (JP);
Hirotoshi Ishibashi, Tokyo (JP)

(73) Assignee: SMK Corporation, Tokyo (JP)

( * ) Notice: Subject to any disclaimer, the term of this patent is extended or adjusted under 35 U.S.C. 154(b) by 205 days.

(21) Appl. No.: 10/414,366

(22) Filed: Apr. 15, 2003

(65) Prior Publication Data
US 2003/0231170 A1 Dec. 18, 2003

(30) Foreign Application Priority Data
Jun. 18, 2002 (JP) ............................. 2002-177119

(51) Int. Cl.
*G09G 5/00* (2006.01)
*G06F 3/043* (2006.01)

(52) U.S. Cl. .................................. 345/173; 178/18.04

(58) Field of Classification Search ........ 345/173–179; 178/18.01–18.09, 18.11, 19.01–19.06
See application file for complete search history.

(56) References Cited

U.S. PATENT DOCUMENTS

| | | | |
|---|---|---|---|
| 5,504,980 A * | 4/1996 | Yoshinaga et al. ......... | 29/25.35 |
| 5,977,867 A * | 11/1999 | Blouin ..................... | 340/407.2 |
| 6,118,435 A * | 9/2000 | Fujita et al. ................ | 345/173 |
| 6,429,846 B1 * | 8/2002 | Rosenberg et al. ......... | 345/156 |
| 2003/0067451 A1 * | 4/2003 | Tagg et al. ................. | 345/174 |

FOREIGN PATENT DOCUMENTS

| | | | |
|---|---|---|---|
| JP | 3-6731 | | 1/1991 |
| JP | 04309273 A | * | 10/1992 |
| JP | 5-53715 A1 | | 3/1993 |
| JP | 5-33235 | | 4/1993 |
| JP | 5-289806 A1 | | 11/1993 |
| JP | 6-242875 A1 | | 9/1994 |

* cited by examiner

*Primary Examiner*—Alexander Eisen
(74) *Attorney, Agent, or Firm*—Darby & Darby

(57) ABSTRACT

A digitizing tablet that can control the vibration of an operation panel or a support substrate is disclosed. A piezoelectric substrate having a pair of drive electrodes fixed to the front and rear surfaces of the piezoelectric substrate is fixed directly or via one of the drive electrodes to the operation panel or the support substrate. A drive voltage is applied to the pair of drive electrodes after an input as been detected, and the drive voltage causes the expandable piezoelectric substrate to vibrate the operation panel or the support substrate. An additional vibration source is not required. Therefore, the vibration energy is not dissipated and there is no time delay in transmission since the operation panel or the support substrate are vibrated directly by the piezoelectric substrate. The expansion and contraction of the piezoelectric substrate can be controlled so that the vibration can be controlled precisely.

21 Claims, 7 Drawing Sheets

DIGITIZING TABLET

FIELD OF THE INVENTION

The present application claims priority under 35 U.S.C. §119 to Japanese Patent Application No. 2002-177119 filed on Jun. 18, 2002. The content of the application is incorporated herein by reference in its entirety.

The present invention relates to a digitizing tablet which vibrates an operation panel or a support substrate after an input is detected. The support substrate supports the operation panel. A piezoelectric substrate in the digitizing tablet vibrates the operation panel or the support substrate. The operator feels or hears the vibration transmitted in response to the input.

BACKGROUND OF THE INVENTION

A digitizing tablet (or digitizer) has an operation panel (or a touch panel) which is supported by a support substrate. An indicator such as a stylus pen or a finger is positioned at an input position as it contacts or is in close proximity to the operation panel. Data relating to the detection of the input position is transmitted to a processing device such as a personal computer.

Components such as the operation panel, the support substrate, an insulating layer, and electrodes may be transparent. Therefore, the digitizing tablet may be disposed on a display screen such as a liquid crystal panel or CRT. An input can be received via the input surface of the operation panel of the digitizing tablet with reference to the display on the display screen. The input position data associated with the location of the input relative to the display on the display screen can be delivered to the processing device.

Typical digitizing tablets are classified according to their methods for detecting input positions relative to the operation panel. Japanese Patent Laid-Open Publication No. Hei 5-289806 discloses the electromagnetic coupling method; Japanese Patent Laid-Open Publication No. Hei 6-242875 discloses the capacitive coupling method; Japanese Utility Model Laid-Open Publication No. Hei 3-6731 discloses the touch method; Japanese Patent Laid-Open Publication No. Hei 5-53715 discloses the resistive method; and Japanese Utility Model Laid-Open Publication No. Hei 5-33235 discloses the optical coupling method. However, the operator must check a processing device such as a personal computer when using these methods to verify that the input was received successfully. Therefore, the operator does not know if the input on the operation panel has been detected by the digitizing tablet.

A force feedback tablet vibrates the operation panel or the support substrate so that the operator can feel the vibration via a stylus pen or a finger that is in contact with the operation panel. The force feedback tablet provides feedback to the operator when an input touch has been detected by the digitizing tablet.

FIG. 9 shows a typical force feedback tablet 100. The force feedback tablet 100 has a main tablet body 100A which includes an operation panel 101, a plastic sheet 102, and a support substrate 103. The operation panel 101 is made of a plastic flexible sheet, and the support substrate 103 is made of glass. A plastic sheet 102 is affixed to the surface of the support substrate 103 which is opposite to the operation panel 101. The operation panel 101 is spaced slightly apart from the support substrate 103, and multiple insulating projections 104 are interposed between the operation panel 101 and the support substrate 103.

The force feedback tablet 100 is a resistive digitizing tablet with an electrically conductive layer (not shown) of a uniform resistive film formed on the opposing surfaces of the operation panel 101 and the plastic sheet 102. The electrically conductive layers contact each other and provide electrical conduction at the input position when the input in the form of a touch is transmitted to the surface of the operation panel 101. The lead electrodes (not shown) are connected electrically to the periphery of the electrically conductive layers to detect the input position.

Truncated conical cushion mounts 106 are provided on the bottom surface of a housing 105 and support the support substrate 103. The entire main tablet body 100A is placed on the cushion mounts 106 made of rubber having a hardness of 50 to 60 degrees. The cushion mounts 106 must be hard enough to provide sufficient resistance to the input touch on the operation panel 101.

A display panel 107 is disposed between the housing 105 and the support substrate 103 which is supported on the cushion mounts 106. Each of the components formed on the support substrate 103 are transparent so that the display appearing on the display panel 107 can be seen when viewed from above the operation panel 101.

A piezoelectric actuator 108 is located at an edge of the rear surface of the support substrate 103. The piezoelectric actuator 108 comprises a plurality of piezoelectric substrates stacked in layers and is made of a piezoelectric material such as piezoelectric ceramic. The piezoelectric actuator 108 vibrates due to the electrostrictive effect of the piezoelectric substrate and serves as a vibration source when a drive voltage is applied to the piezoelectric substrate.

The proximal end of the piezoelectric actuator 108 is fixed to a support base 109, and a support shaft 110 rotatably supports the intermediate portion of the piezoelectric actuator 108. A contact 111 is fixed to the distal end of the piezoelectric actuator 108 and contacts the rear surface of the support substrate 103.

Pressing a position for the input touch on the operation panel 101 will cause the electrically conductive layers to contact each other at the input position. The input position detection means (not shown) detects the input and the input position in order to deliver the data corresponding to the input position to a processing device such as a personal computer.

A drive voltage is applied to the drive electrodes of the piezoelectric actuator 108 causing the piezoelectric actuator 108 to vibrate when the input is detected. The vibration is transmitted to the support substrate 103 via the contact 111 disposed at the distal end of the piezoelectric actuator 108 so that the finger pressing the operation panel 101 senses the vibration.

The operator can verify from the vibration that the input touch has been accomplished successfully after providing the input touch to the digitizing tablet.

The conventional digitizing tablet employs a vibrating element such as a piezoelectric actuator, a vibration motor, and the like as its vibration source in order to vibrate the operation panel 101 or the support substrate 103. The vibration source is separate from the operation panel 101 and the support substrate 103 which constitute the digitizing tablet. Therefore, the housing 105 and the entire input device is larger in order to accommodate the separate vibration source, and the design of the outer shape needs to be limited.

Additionally, the piezoelectric actuator 108, acting as the vibration source, must produce sufficiently large displacements in order to transmit a vibration that can be detected on the main tablet body 100A which contacts the piezoelectric actuator 108. Therefore, a plurality of piezoelectric substrates are stacked in layers in the piezoelectric actuator 108. The layers of piezoelectric substrates increase the thickness of the piezoelectric actuator 108. Furthermore, a pair of drive electrodes are affixed to each piezoelectric substrate and are stacked in the direction of thickness of the piezoelectric actuator 108. The manufacturing process of stacking the layers of piezoelectric substrates requires many steps and is expensive.

Furthermore, a vibration motor is large and expensive if employed as the vibration source.

It is difficult to transmit the vibrations from the vibration source to the main tablet body 100A since the vibrations are indirect and originate from vibration sources which are separate from the main tablet body 100A. The main tablet body 100A is unable to convey precise changes in vibration frequency for transmitting different types of information to the operator, thereby making it impossible to transmit information accurately.

It is difficult to transmit exact changes in vibration directly to the main tablet body 100A since there is a delay in transmitting the vibration from the vibration source to the main tablet body 100A.

The drive circuit for driving the vibration source must include an oscillation circuit so that the vibration source such as the piezoelectric actuator 108 or the vibration motor can vibrate continuously for a certain period of time. This oscillation circuit complicates the drive circuit. A vibration source such as a vibration motor cannot be activated by a drive voltage with an instantaneous pulse waveform and requires a drive circuit having an activation control function to operate continuously for a certain period of time. A vibration source such as the piezoelectric actuator 108 contracts and expands instantaneously in response to the application of a drive voltage with an instantaneous pulse waveform. However, the contraction and expansion is damped when transmitted to the main tablet body 100A, thereby making it impossible for the operator to sense vibration instantaneously.

Securing the piezoelectric actuator 108 to the housing 105 requires a complicated structure for rotatably supporting the intermediate portion of the piezoelectric actuator 108 on the support shaft 110 and for supporting the end of the piezoelectric actuator 108 on the support base 109. The piezoelectric actuator 108 vibrates or generates a noise if not attached securely, thereby making it impossible to transmit the vibration to the main tablet body 100A.

Furthermore, the configuration of the piezoelectric actuator 108 and a vibration transmission mechanism of the main tablet body 100A, such as the support substrate 103, must be manufactured accurately. A gap between the contact 111 and the support substrate 103 would generate noise and vibrations that can damp the amplitude of the vibrations intended for the operator.

Digitizing tablets employing the magnetic coupling method, the capacitive coupling method, and the optical coupling method do not require an indicator such as a stylus pen or the operator's finger to physically contact the operation panel. It is impossible to transmit vibrations to the operator through the operation panel or the support substrate in order to indicate the detection of the input on the digitizing tablet.

SUMMARY OF THE INVENTION

The present invention provides a digitizing tablet that can vibrate the operation panel or the support substrate without increasing the size of the tablet or limiting the design of the tablet's outer shape. The vibration of the operation panel or the support substrate can be controlled precisely. A simple drive circuit allows the operation panel or the support substrate to transmit a vibration that the operator can sense. Furthermore, the digitizing tablet can notify the operator of the detection of an input without requiring an indicator such as a finger to contact the operation panel.

The digitizing tablet includes an operation panel having an input surface; a support substrate for supporting the rear surface of the operation panel; and input position detection means. The input position detection means detects an input transmitted via the input surface of the operation panel and an input position of the input and outputs data regarding the input position. The operation panel or the support substrate vibrates when an input is detected. The vibration transmits a feeling of the input to the operator. A pair of drive electrodes are fixed to both front and rear surfaces of a piezoelectric substrate which is fixed to the operation panel or the support substrate directly or via one of the drive electrodes. A drive voltage is applied to the pair of drive electrodes upon detection of the input received via the input surface of the operation panel, thereby causing the expandable piezoelectric substrate to vibrate the operation panel or the support substrate.

The electrostrictive effect of the piezoelectric substrate causes the piezoelectric substrate to contract and expand as a drive voltage is applied across the pair of drive electrodes. Since the piezoelectric substrate is fixed directly to the operation panel or the support substrate via one of the drive electrodes, the contraction and expansion of the piezoelectric substrate generates a stress on the the operation panel or the support substrate to which it is fixed. The stress causes vibrations of a large amplitude in the operation panel or the support substrate.

The waveform of the drive voltage that drives the piezoelectric substrate can vary to provide different types of vibrations on the operation panel or the support substrate.

The piezoelectric substrate can be disposed in a space between the operation panel and the support substrate placed under the operation panel. The piezoelectric substrate is fixed to either one of the opposing surfaces of the operation panel and the support substrate.

The piezoelectric substrate can be formed in a single layer by a piezoelectric material and can be thin. Therefore, the piezoelectric substrate can be disposed in the narrow space between the operation panel and the support substrate.

Additional space is not necessary for the vibration source since the piezoelectric substrate can be accommodated with part of the input position detection means in the space between the operation panel and the support substrate.

The piezoelectric substrate can be fixed directly to the rear surface of the support substrate or via the drive electrode.

A vibration function can be added to the digitizing tablet without changing the above described structure since the piezoelectric substrate is fixed only to the rear surface of the support substrate of the digitizing tablet via one of the drive electrodes.

Upon detection of an input received on or in close proximity to the input surface, an input low-voltage trigger pulse causes the induction of an output voltage across a coil. The output voltage is applied as a drive voltage to the pair of drive electrodes on the piezoelectric substrate.

The operation panel or the support substrate vibrates with a large amplitude so that the operator can feel the vibration on the operation panel or the support substrate. The vibration is sufficiently strong since the drive voltage applied to the piezoelectric substrate is an instantaneous pulse waveform that is induced across the coil by the input of a trigger pulse.

Upon detection of an input received on or in close proximity to the input surface, a drive voltage is applied at an audible band frequency to the pair of drive electrodes that expands and contracts the piezoelectric substrate, thereby vibrating the operation panel or the support substrate at the audible band frequency. The vibrations produce a sound that indicates the detection of the input.

The operation panel or the support substrate vibrates at an audible band frequency to generate a sound indicative of the detection of the input. Therefore, the operator can be notified of the detection of the input without physically contacting the operation panel with an indicator such as a finger.

Furthermore, the sound provides a response to the input without requiring a loudspeaker or the like.

DETAILED DESCRIPTION OF THE PREFERRED EMBODIMENTS

Figure 1:
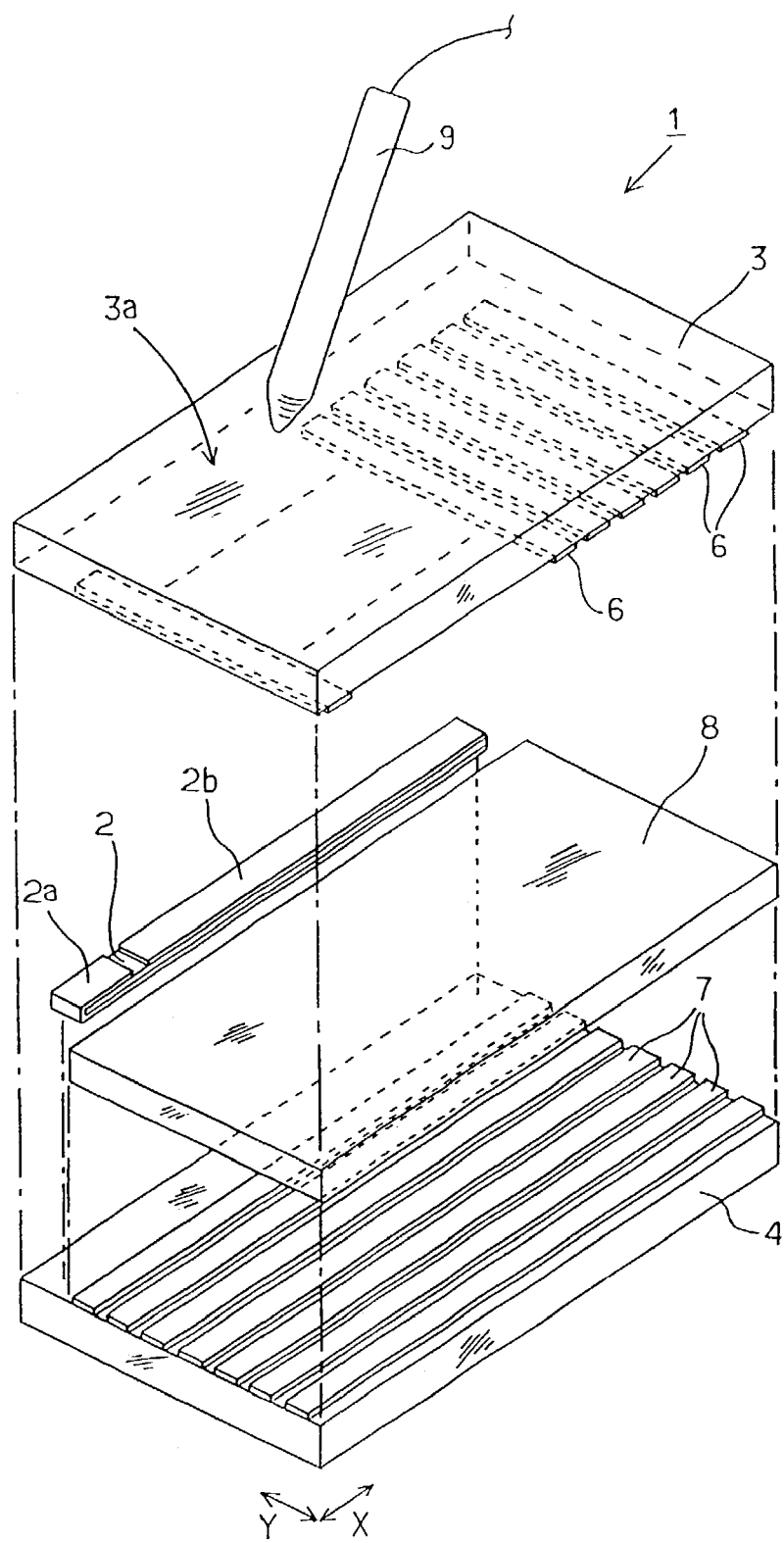
FIG. 1 is an exploded perspective view of a digitizing tablet 1 according to the present invention.

A digitizing tablet 1 of the present invention employs the capacitive coupling method in which column electrodes 6 and row electrodes 7 are formed on the respective opposing surfaces of an operation panel 3 and a support substrate 4. An insulating sheet 8 is placed between the operation panel 3 and the support substrate 4. A voltage pulse is input to the column electrodes 6 or the row electrodes 7 by the stylus pen 9. The voltage pulse is captured to detect the input position of the stylus pen 9 relative to the operation panel 3.

The operation panel 3 is a plate of transparent glass, acrylic, or any insulating material. The operation panel 3 must be transparent in order to view a display portion (not shown) provided under the support substrate 4. A transparent hard coating agent (not shown) is applied to the surface of the operation panel 3 to protect the upper surface of an input surface 3a.

Figure 4:
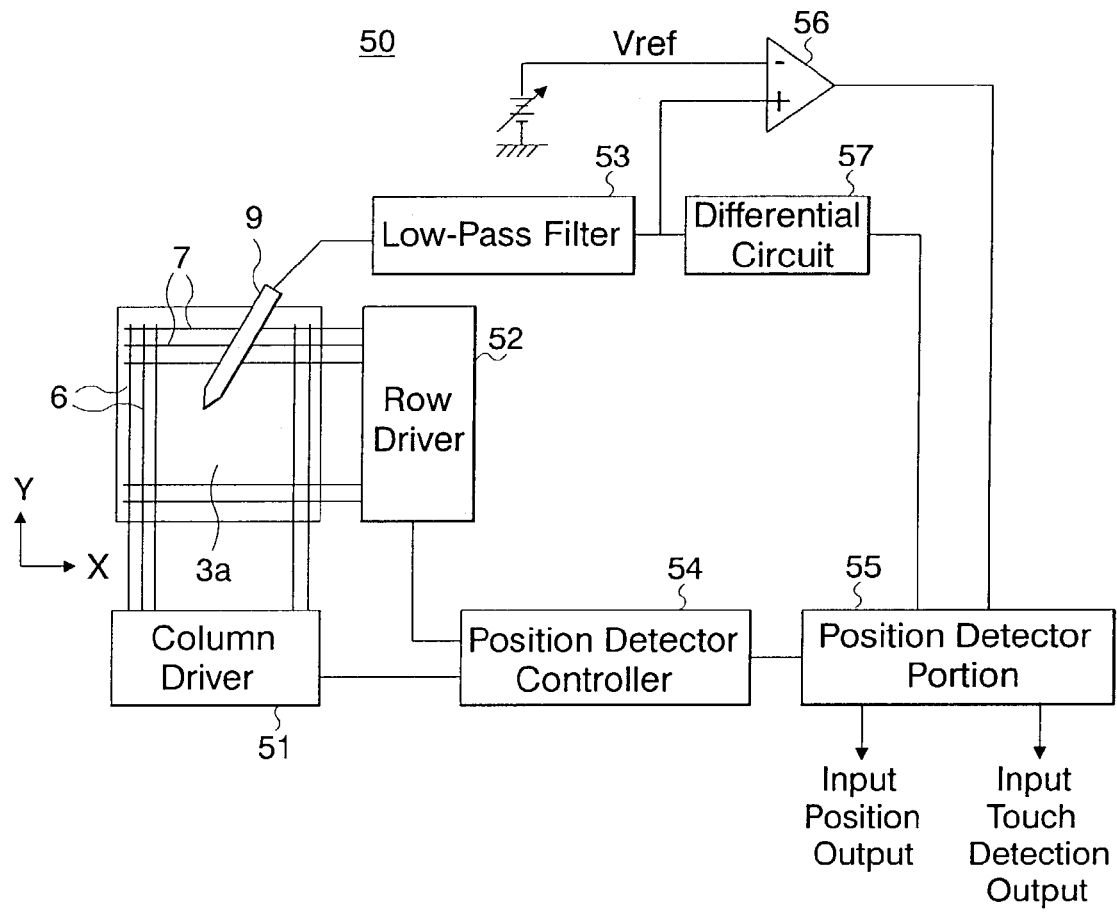
FIG. 4 is a block diagram of the configuration of an input position detector circuit 50 according to the present invention.

The inner surface of the operation panel 3 supports column electrodes 6 extending in the Y direction of FIG. 1. The column electrodes 6 are printed at predetermined intervals in the X direction and receive successive voltage pulses from a column driver 51 in an input position detector circuit 50 as shown in FIG. 4.

The support substrate 4 shares the same outline as the operation panel 3 and is a thin rectangular plate made of transparent soda-lime glass. Row electrodes 7 are insulated from each other on the support substrate 4. The support substrate 4 must be made of an insulating material. Additionally, the support substrate 4 must be sufficiently rigid in order to support the row electrodes 7 and the rear surface of the operation panel 3. However, the support substrate 4 is similar to the operation panel 3 since it is not necessarily transparent if there is no display portion. The support substrate 4 may also be made of a plastic such as acrylic.

The upper surface of the support substrate 4 faces the operation panel 3 and supports the row electrodes 7. The row electrodes 7 extend in the X direction of FIG. 1 and are printed at predetermined intervals in the Y direction. The row electrodes 7 receive successive voltage pulses from the row driver 52 in the input position detector circuit 50 at different time intervals from those of the column driver 51.

An insulating sheet 8 provides an insulating layer between the column electrodes 6 and the row electrodes 7. The insulating sheet 8 is placed between the operation panel 3 and the support substrate 4 so that the column electrodes 6 and the row electrodes 7 are positioned on opposite sides of the insulating sheet 8. When the stylus pen 9 is placed near the row electrodes 7 as shown in FIG. 1, the insulating sheet 8 acts as a capacitive dielectric that allows the row electrodes 7 to couple. The insulating sheet 8 is transparent if a display portion is disposed under the support substrate 4. However, a fluorescent layer may be disposed under the insulating sheet 8 in displays such as EL panels to allow the insulating sheet 8 to serve as a display portion. This fluorescent layer emits light when a voltage is applied to the column electrodes 6 and the row electrodes 7.

The insulating sheet 8 and the piezoelectric substrate 2 are located between the operation panel 3 and the support substrate 4. The insulating sheet 8 is a rectangular sheet having a width in the Y direction that is shorter than the width of the operation panel 3 and the support substrate 4. The piezoelectric substrate 2 is located in the space between the operation panel 3 and the support substrate 4 that is unoccupied by the insulating sheet 8.

The piezoelectric substrate 2 is a single-layered substrate made of a piezoelectric material such as piezoelectric single crystal, piezoelectric ceramic such as PZT (lead zirconate titanate) ceramic, or poly vinylidene fluoride (PVDF). PZT-based piezoelectric ceramic is used commonly to increase the durability of the piezoelectric substrate 2. The piezoelectric substrate 2 is a thin plate extending in the X direction along a side of the digitizing tablet 1 as shown in FIG. 1. The piezoelectric substrate 2 can produce large strains and can be actuated at a low voltage.

Figure 3A:
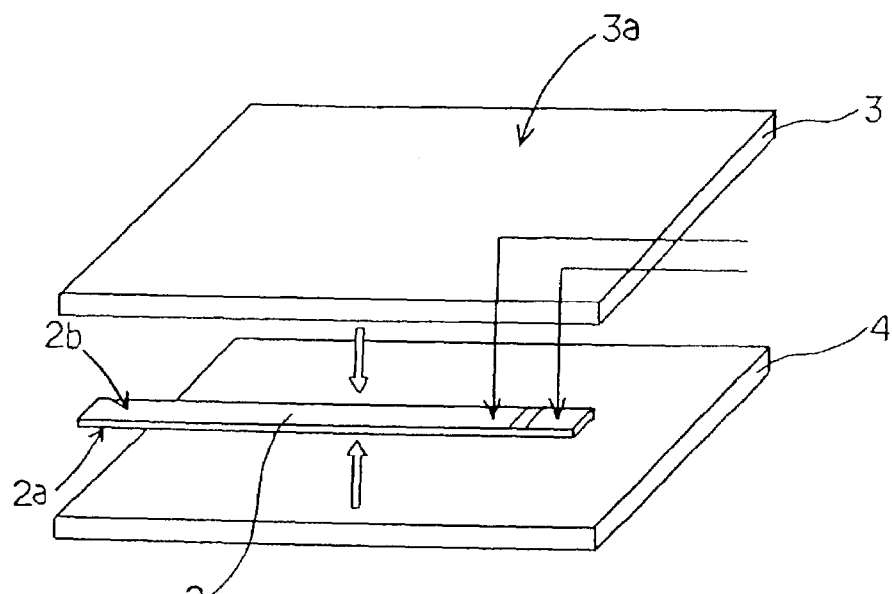
FIG. 3(a) is an explanatory view of a piezoelectric substrate 2 attached to the digitizing tablet 1 according to the present invention.
Figure 3B:
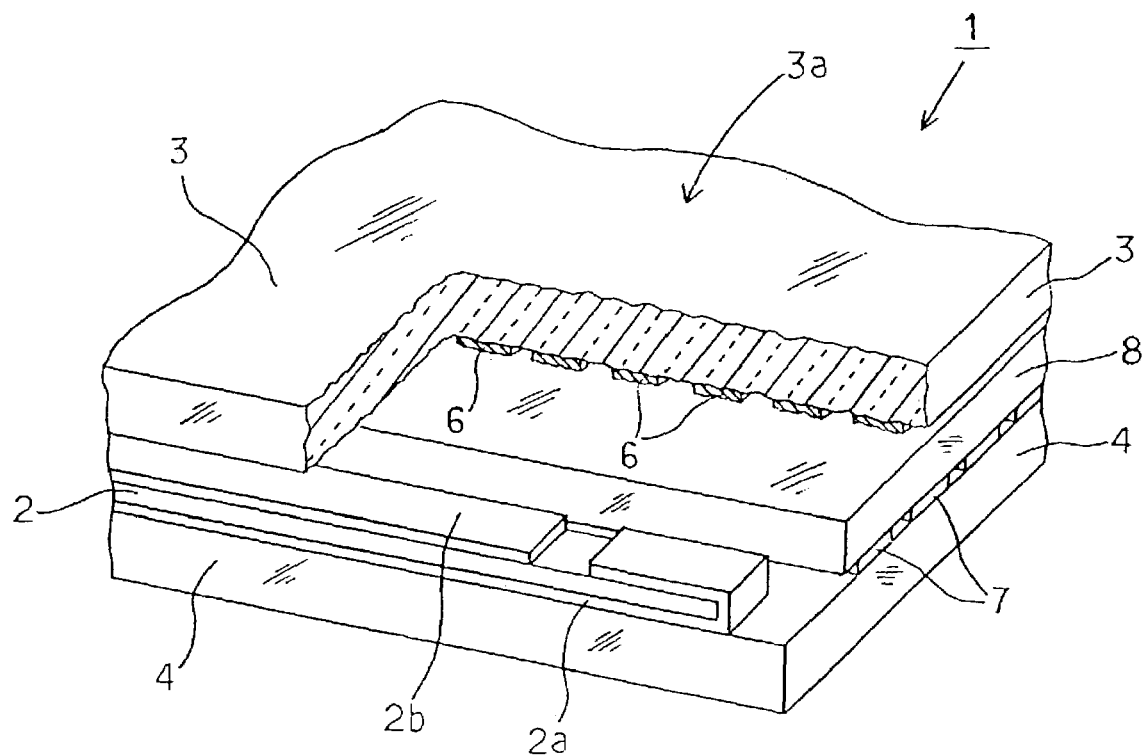
FIG. 3(b) is an exploded perspective view of the main portion of the digitizing tablet 1 according to the present invention.

A pair of drive electrodes 2a, 2b apply a drive voltage to the piezoelectric substrate 2. The drive electrodes 2a, 2b are made from an electrically conductive metallic material evaporated onto the front and rear surfaces of the piezoelectric substrate 2 through a process such as screen printing or the like. Then, the drive electrodes 2a, 2b are fixed by baking. Drive electrode 2a covers the rear surface of the piezoelectric substrate 2 and is folded onto the front surface of the piezoelectric substrate 2 as shown in FIG. 3. Although both drive electrodes 2a, 2b cover the front surface of the substrate, there is a space between them so that the piezoelectric substrate 2 is partially exposed on the front surface. Therefore, drive electrode 2a does not contact drive electrode 2b.

Drive electrodes 2a, 2b are fixed to the front and rear surfaces of the piezoelectric substrate 2 which is disposed with the column electrodes 6, the row electrodes 7, and the insulating sheet 8 in the narrow space between the operation panel 3 and the support substrate 4. The piezoelectric substrate 2 and drive electrodes 2a, 2b have a height on the order of 200 μm. Therefore, the piezoelectric substrate 2 and drive electrodes 2a, 2b are sufficiently thin to be accommodated in the narrow space between the operation panel 3 and the support substrate 4.

The rear surface of the piezoelectric substrate 2 is attached to drive electrode 2a and to the surface of the support substrate 4 along a side of the digitizing tablet 1 using an adhesive such as an epoxy-based or acryl-based adhesive. Drive electrodes 2a, 2b exposed on the side surface of the digitizing tablet 1 are drawn outwardly from between the operation panel 3 and the support substrate 4 using a drawing lead wire (not shown) and connected to the drive circuits 10, 11, respectively.

The electrostrictive effect of the piezoelectric substrate 2 causes the support substrate 4 to vibrate since it is fixed to the support substrate 4. Stresses are generated when the piezoelectric substrate 2 contracts and expands, and these stresses produce vibrations of a large amplitude on the support substrate 4. For example, an electric field of $10 \times 10^5$ V/m generates a strain of $5.9 \times 10^4$ when applied to a PZT-based piezoelectric material with a dielectric constant of 3400, a piezoelectric modulus of $590 \times 10^{-12}$ C/N, and an elastic compliance of $20 \times 10^{-12}$ m$^2$/N. A stress as large as $3 \times 10^7$ N/m is produced when this strain is clamped.

This electrostrictive effect produces vibrations on the support substrate 4 that are large enough for the operator to feel via the operation panel 3 and the stylus pen 9. The vibrations can be produced by applying a drive voltage of about ±20 V across the pair of drive electrodes 2a, 2b in the direction of the thickness as shown by the arrows of FIG. 3(a). The amplitude of the vibrations can be adjusted by varying the drive voltage and the length of the piezoelectric substrate 2 that is fixed to the support substrate 4.

The piezoelectric substrate 2 is located along a side of the digitizing tablet 1 where the row electrodes 7 are not printed. Therefore, the input surface 3a through which input positions can be detected is not narrowed significantly. Alternatively, the piezoelectric substrate 2 can be located along both sides of the support substrate 4 in the Y direction.

Figure 2:
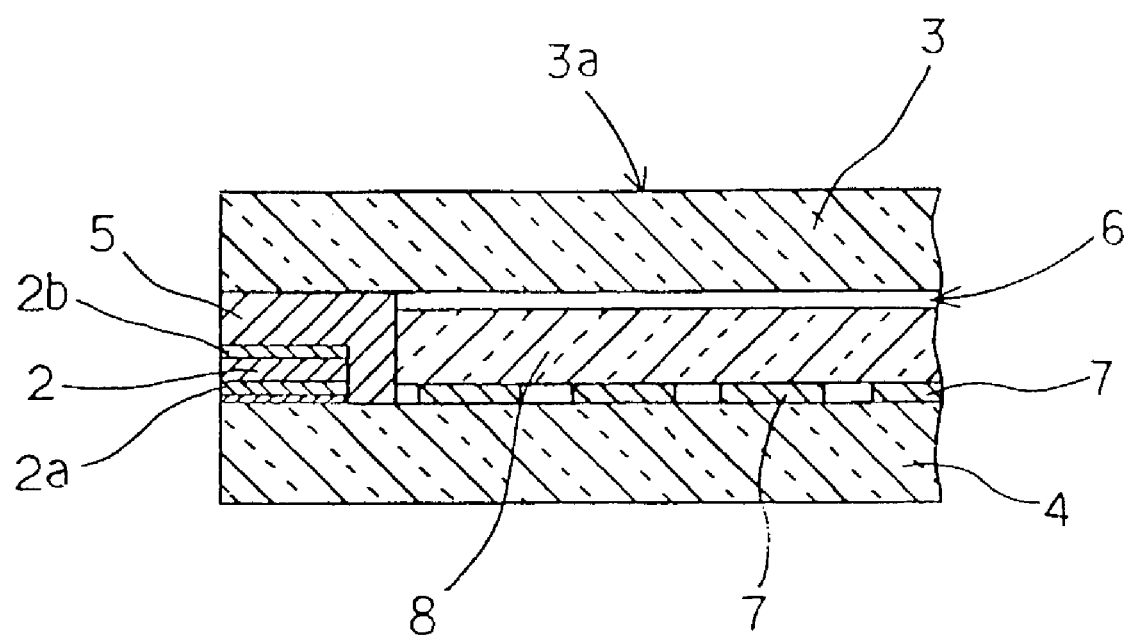
FIG. 2 is a longitudinal sectional view of the main portion of the digitizing tablet 1 according to the present invention.

The piezoelectric substrate 2 is fixed to the support substrate 4 via drive electrode 2a as shown in FIG. 2. The periphery of the opposing surfaces of the operation panel 3 and the support substrate 4 are fixed to each other using an adhesive. The piezoelectric substrate 2 and the insulating sheet 8 are sandwiched between the operation panel 3 and the support substrate 4. The piezoelectric substrate 2 can contract and expand without being confined by the operation panel 3 in the absence of an adhesive or, alternatively, in the presence of a sticky material layer 5 as shown in FIG. 2. The sticky material layer 5 is located between the piezoelectric substrate 2 and the operation panel 3.

The stylus pen 9 is an electrical pen-shaped conductor which is held in the operator's hand. One end of the stylus pen 9 is connected electrically to a low-pass filter 53 of the input position detector circuit 50 as shown in FIG. 4.

The input position detector circuit 50 detects an input and the input position of the stylus pen 9 relative to the input surface 3a of the operation panel 3. The operation panel 3 serves as a dielectric when an input is transmitted at a particular position by the stylus pen 9 via the input surface 3a of the operation panel 3. The operation panel 3 is made of a glass plate or an insulator so that capacitive coupling occurs between the stylus pen 9 and each of the column electrodes 6 and each of the row electrodes 7.

The input position of the stylus pen 9 can be detected when the stylus pen 9 contacts or is in close proximity to the operation panel 3. The capacitance between the operation panel 3 and the insulating sheet 8 is at a maximum value when the stylus pen 9 contacts the operation panel 3 and the column electrodes 6 or the row electrodes 7 located below the operation panel 3. The column driver 51 and the row driver 52 apply a voltage pulse to each of the column electrodes 6 and the row electrodes 7, respectively, at different time intervals. When the stylus pen 9 induces the maximum voltage, the input position can be determined by identifying the column electrodes 6 or the row electrodes 7 that applied the voltage pulse.

The stylus pen 9 must directly contact or be in close proximity to the input surface 3a of the operation panel 3 to induce a sufficient capacitance with respect to the column electrodes 6 or the row electrodes 7. The capacitance must be larger than a predetermined value. Then, a voltage pulse is applied to either the column electrodes 6 or the row electrodes 7 to induce a voltage at the stylus pen 9. An input can be detected when the voltage at the stylus pen 9 is greater than a predetermined value. This occurs when the stylus pen 9 has contacted or is in close proximity to the input surface 3a.

A position detector controller 54 controls the time interval between the application of the voltage pulses to each of the column electrodes 6 and the row electrodes 7. The position detector controller 54 is connected to and delivers the control signals to the column driver 51 and the row driver 52 as shown in FIG. 4. The column driver 51 applies successive voltage pulses to the column electrodes 6 from one end to the other, and the row driver 52 applies successive voltage pulses to the row electrodes 7 from one end to the other in the same manner. The position detector controller 54 scans across all the column electrodes 6 and row electrodes 7 in one frame period and repeats the process. Additionally, the position detector controller 54 outputs a clock pulse at a constant frequency and a reset signal at each frame period to a position detector portion 55 which is connected to the column driver 51 and the row driver 52.

The successive application of voltage pulses to the column electrodes 6 and the row electrodes 7 induces a voltage at the stylus pen 9 when it is in close proximity to either one of the drive electrodes 2a, 2b. The stylus pen 9 delivers an output signal to the low-pass filter 53 when the voltage is induced.

The low-pass filter 53 is connected to a comparator 56 and a differential circuit 57. The low-pass filter 53 converts an output step signal from the stylus pen 9 to a continuous signal and delivers the continuous signal to the comparator 56 and the differential circuit 57. The comparator 56 compares the output from the low-pass filter 53 or the voltage induced at the stylus pen 9 to a reference voltage Vref. The potential of the reference voltage Vref is slightly lower than the maximum output voltage of the low-pass filter 53 in one frame period when the stylus pen 9 contacts or is in close proximity to the input surface 3a of the operation panel 3.

The comparator 56 delivers an "H"-level detection signal to the position detector portion 55 when a voltage that is greater than the reference voltage Vref is transmitted to the low-pass filter 53. The position detector portion 55 determines that an input is being detected when the position detector portion 55 receives the "H"-level detection signal.

Figure 5:
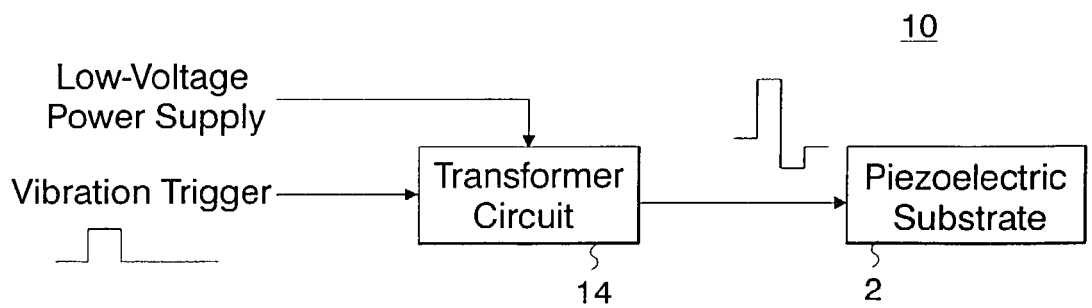
FIG. 5 is a block diagram of the configuration of a first drive circuit 10 for driving the piezoelectric substrate according to the present invention.
Figure 7:
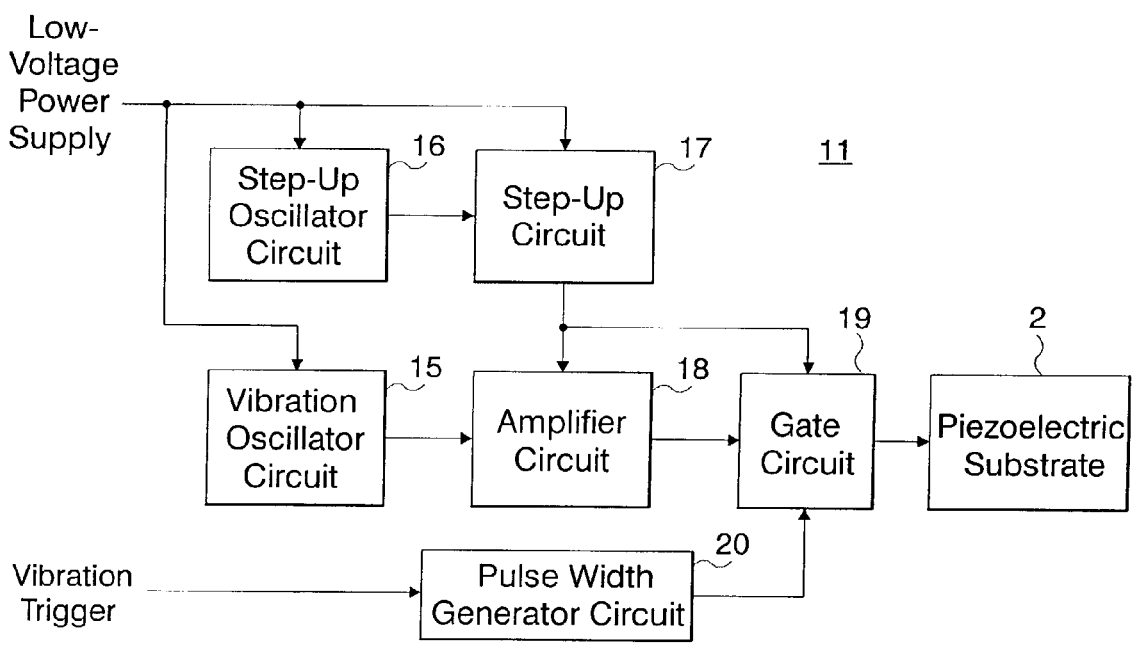
FIG. 7 is a block diagram of the configuration of a second drive circuit 11 for driving the piezoelectric substrate 2 according to the present invention.

The comparator 56 continuously delivers a "L"-level detection signal into the position detector portion 55 when an input has not been detected for a predetermined period of time. The position detector portion 55 determines that an input has been detected by the digitizing tablet 1 for the first time when the comparator 56 continuously delivers the "L"-level output for more than a predetermined period of time and then begins delivering an "H"-level output. Then, the position detector portion 55 delivers a vibration trigger pulse to the first drive circuit 10 or the second drive circuit 11, as shown in FIG. 5 or 7.

The output magnitude of the output from the comparator 56 to the differential circuit 57 gradually increases or decreases while successive voltage pulses are applied to the column electrodes 6 and the row electrodes 7. The magnitude of the output from the comparator 56 reaches a maximum value during the time intervals in which voltage pulses are applied to the column electrodes 6 and the row electrodes 7 located directly under the stylus pen 9.

The position detector portion 55 is connected to the output side of the differential circuit 57 and monitors the output from the differential circuit 57. The position detector portion 55 determines when the comparator 56 delivers the maximum output when the output from the differential circuit 57 changes from positive to negative and when the voltage pulses are applied to the column electrodes 6 and the row electrodes 7 located directly under the stylus pen 9. The position detector portion 55 counts the clock pulses delivered from the position detector controller 54 and then resets the count each time the reset signal is received. The column electrode 6 or the row electrode 7 under the stylus pen 9 can be identified based on the count at which the output is at a maximum. Thus, the X and Y coordinates of the input position of the stylus pen 9 are determined based on the identified column electrode 6 and the row electrode 7 and are delivered at single frame period intervals to a processing device such as a personal computer.

The digitizing tablet 1 repeatedly detects the input position of the stylus pen 9 since the input is detected periodically via the operation panel 3. However, if an input is detected after a predetermined period of time in which no input has been detected, the position detector portion 55 determines that an input has been detected, actuates the first drive circuit 10, and delivers a trigger pulse to vibrate the support substrate 4.

The first drive circuit 10 is a simple circuit in which the pair of drive electrodes 2a, 2b of the piezoelectric substrate 2 are connected to the output side of a transformer circuit 14 which includes a coil as shown in FIG. 5. Upon detection of an input, the position detector portion 55 outputs a vibration trigger signal having a period of 5 to 10 msec to the transformer circuit 14, and a direct-current low voltage of a few volts is applied instantaneously to the transformer circuit 14. Accordingly, a coil-induced voltage is provided by the transformer circuit 14, and a drive voltage of the order of ±40 V is applied to the piezoelectric substrate 2.

The piezoelectric substrate 2 contracts and expands when the drive voltage is applied to the piezoelectric substrate 2. The contraction and expansion vibrates the support substrate 4 which is fixed to the piezoelectric substrate 2. The drive voltage for driving the piezoelectric substrate 2 is an instantaneous pulse in waveform that vibrates the support substrate 4 only while the drive voltage is applied to the piezoelectric substrate 2. Vibrations of a large amplitude can be produced during this short period of time. The operation panel 3 and the stylus pen 9 can transmit the vibrations to the operator's fingertips. The vibrations allow the operator to recognize that the input has been detected by the digitizing tablet 1.

The first drive circuit 10 for generating vibrations can be configured without having to employ a step-up oscillator circuit or a vibration transmitter circuit for maintaining the vibrations for a certain period of time.

The support substrate 4 vibrates due to the contraction and expansion of the piezoelectric substrate 2. The waveform of the drive voltages for driving the contraction and expansion of the piezoelectric substrate 2 can be changed to transmit different types of vibrations to the operator, as shown in FIG. 6.

Figure 6A:
FIG. 6(a) illustrates a drive voltage waveform for generating a click feeling according to the present invention.

FIG. 6(a) illustrates a drive voltage waveform that transmits a click feeling to the operator. The click feeling is similar to the feeling that is produced when pressing a pushbutton supported by a conical spring. The waveform generates two pulses that each have a period of 5 to 10 msec after detecting the input. This waveform causes the support substrate 4 to vibrate twice almost instantaneously.

Figure 6B:
FIG. 6(b) illustrates a drive voltage waveform for generating a gradual vibration feeling according to the present invention.

FIG. 6(b) illustrates a sinusoidal drive voltage waveform with a frequency between 20 to 30 Hz which generates an identical sinusoidal vibration on the support substrate 4. The waveform allows the operator to feel a vibration similar to that which is produced by a vibration motor.

Figure 6C:
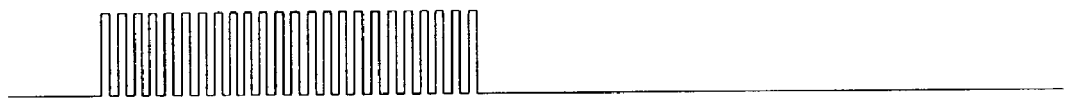
FIG. 6(c) illustrates a drive voltage waveform for generating an audible sound according to the present invention.

FIG. 6(c) illustrates an alternating drive voltage waveform having a period of a few hundred milliseconds which generates vibrations on the support substrate 4 at intervals of the same period. The operator does not feel any vibrations since the support substrate 4 vibrates at an audible band frequency of a few kilohertz, there is no feeling of vibration that can be transmitted to the operator. However, the vibration of the support substrate 4 produces sound so that the operator can be informed of when an input has been detected without using the stylus pen 9. Furthermore, a loudspeaker is not necessary to generate the sound.

Figure 6D:
FIG. 6(d) illustrates a drive voltage waveform for generating an audible sound after a click feeling according to the present invention.

FIG. 6(d) illustrates a combination of the drive voltage waveforms of FIGS. 6(a) and (b) which provides the operator with a click feeling via the stylus pen 9 and an audible sound. The operator can use these two responses to verify that the input has been detected.

Personal digital assistants (PDA's) such as portable telephones are equipped with a display board, a vibration motor, and a loudspeaker. The display board displays input characters or the contents of an incoming call, and the vibration motor informs the user of an incoming call. Devices such as PDA's are compact and lightweight. It is impossible to attach additional vibration components such as piezoelectric actuators or vibration motors to vibrate the display board, and devices with vibrating display boards have not been developed yet. The display board according to the present invention can be used as the operation panel or the support substrate of the digitizing tablet, either of which can be attached to the piezoelectric substrate 2. The drive voltage waveform can be changed so that the piezoelectric substrate 2 can perform various functions.

A second drive circuit 11 shown in FIG. 7 is necessary to drive the piezoelectric substrate 2 in place of the first drive circuit 10 for the drive voltage waveforms shown in FIGS. 6(b)-(d). The second drive circuit 11 includes a vibration oscillator circuit 15 for generating continuous vibrations on the support substrate 4 for a predetermined period of time.

A step-up oscillator circuit 16 in the second drive circuit 11 oscillates at 20 to 30 kHz using a few volts from a direct-current constant power supply. A step-up circuit 17 is connected to the step-up oscillator circuit 16 and performs switching control on the current flowing through a transformer at the same period intervals of the step-up oscillator circuit 16. The step-up circuit 17 steps up the few volts of direct-current constant power supply to a direct-current voltage and delivers the resulting direct-current voltage to an amplifier circuit 18.

The vibration oscillator circuit 15 generates a drive signal with a frequency at which the support substrate 4 vibrates and delivers the drive signal to the amplifier circuit 18. The amplifier circuit 18 increases the drive signal using the direct-current voltage supplied from the step-up circuit 17 and delivers the resulting drive signal to a gate circuit 19.

A pulse width generator circuit 20 is also connected to the input of the gate circuit 19. The pulse width generator circuit 20 generates a pulse having a period during which the support substrate 4 vibrates when a vibration trigger is received. The vibration trigger is generated at an input detector circuit upon detection of an input. The gate circuit 19 transmits the drive signal received from the amplifier circuit 18 to the drive electrodes 2a, 2b of the piezoelectric substrate 2 as a drive voltage while receiving the pulse from the pulse width generator circuit 20.

The frequency of the drive signal generated at the vibration oscillator circuit 15 and the period of the pulse generated at the pulse width generator circuit 20 are arbitrary. It is possible to generate any drive voltage waveform such as the drive voltage waveforms illustrated in FIG. 6.

The piezoelectric substrate 2 is disposed between the operation panel 3 and the support substrate 4. However, the piezoelectric substrate 2 can be fixed to any portion of either the operation panel 3 or the support substrate 4.

Figure 8:
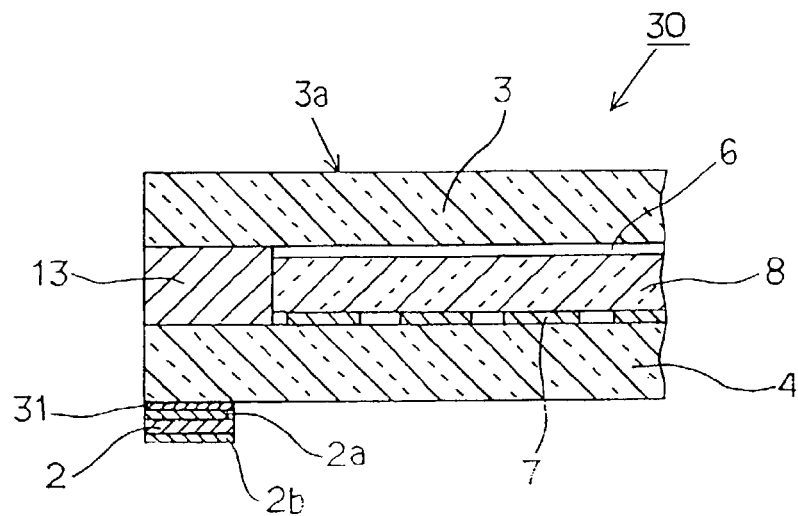
FIG. 8 is a cross-sectional view of the main portion of a digitizing tablet 30 according to an embodiment of the present invention.
Figure 9:
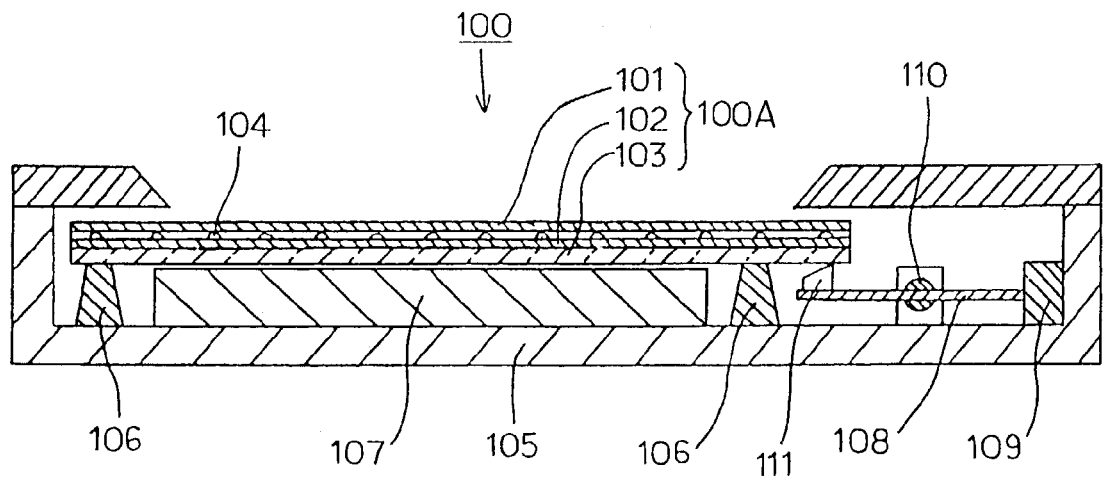
FIG. 9 is a longitudinal sectional view of a conventional digitizing tablet 100.

A digitizing tablet 30 according to an alternate embodiment of the present invention includes the piezoelectric substrate 2 which is fixed to the rear surface of the support substrate 4 as shown in FIG. 8 with like reference numerals indicating like components. The configuration of digitizing tablet 30 is the same as that of the digitizing tablet 1 except that the piezoelectric substrate 2 is attached at a different position.

Drive electrode 2a of the piezoelectric substrate 2 is fixed by an adhesive layer 31 to a side of the rear surface of the support substrate 4. The pair of drive electrodes 2a, 2b are connected electrically to an external circuit which includes the drive circuits 10, 11 via a lead line (not shown).

The piezoelectric substrate 2 of digitizing tablet 30 is not disposed between the operation panel 3 and the support substrate 4. The periphery of the opposing surfaces of the operation panel 3 and the support substrate 4 are fixed to each other with an adhesive 13 without using a sticky material to affix the operation panel 3 to the support substrate 4.

The column electrodes 6 and the row electrodes 7 are not formed on the periphery of the operation panel 3 and support substrate 4. The drive circuits 10, 11 apply a drive voltage to the pair of drive electrodes 2a, 2b upon detection of an input. The drive voltage causes the piezoelectric substrate 2 to expand and contract and the support substrate 4 to vibrate.

The vibrations are transmitted to the operator's hand via the operation panel 3, the support substrate 4, and the stylus pen 9. The vibrations indicate to the operator that the input has been detected.

The digitizing tablet 30 can consist of a piezoelectric substrate 2 that is fixed to a digitizing tablet having a conventional structure which is capable of vibrating.

A drive voltage is applied to the piezoelectric substrate 2 when an input is detected for the first time. It is also possible to apply a drive voltage to the piezoelectric substrate 2 to vibrate the operation panel 3 or the support substrate 4 when an input position and an input are detected within a predetermined display area. The display area can display a particular icon associated with data corresponding to the detected input position. Additionally, drive voltage waveforms can vary for each icon displayed so that the operator can sense different vibration effects. This configuration can allow a visually handicapped operator to recognize the type of icon using his or her finger.

The present invention has been described with reference to digitizing tablets 1, 30 which employ a capacitive coupling method. Additionally, digitizing tablets can detect input positions using methods such as the magnetic coupling method, the contact method, the capacitive method, or the optical coupling method. These digitizing tablets may not require an indicator such as a stylus pen and may be adapted for use with the operator's fingertip. The operation panel 3, the support substrate 4, and other components of other types of digitizing tablets can be made of an insulating material and any material such as a metallic material that does not impair the function for detecting input positions.

The piezoelectric substrate can be fixed to the front surface or the rear surface of the operation panel 3. However, the piezoelectric substrate must have a certain degree of rigidity.

A pair of drive electrodes oppose to each other in the direction of the thickness of the piezoelectric substrate and are affixed to the front and rear surfaces of the piezoelectric substrate. The piezoelectric substrate is fixed to the operation panel or the support substrate via a drive electrode. Therefore, the operation panel or the support substrate can be vibrated with a low drive voltage by allowing an electric field to be applied to the piezoelectric substrate along the direction of the thickness. However, the present invention is not necessarily limited to this method of fixing the piezoelectric substrate. For example, the drive electrodes can be fixed to the side surfaces of the piezoelectric substrate being perpendicular to the operation panel or the support substrate. Therefore, the piezoelectric substrate can be fixed directly to the operation panel or the support substrate.

Vibrations can be produced directly on the operation panel 3 or on the support substrate 4 in order to perform functions for various applications since the piezoelectric substrate is attached directly to the operation panel 3 or the support substrate 4. The piezoelectric substrate deflects under an input when the piezoelectric substrate is fixed to the operation panel. The piezoelectric effect causes the production of a predetermined voltage signal when the piezoelectric substrate experiences a mechanical strain. Then, the piezoelectric substrate delivers the voltage through an integrator circuit which is used to detect the input.

Accelerations can be applied to the piezoelectric substrate. A circuit can remain actuated for only monitoring the output from the piezoelectric substrate while in standby mode until the piezoelectric effect produces a voltage. Accordingly, a voltage can be detected when delivered with an acceleration to the piezoelectric substrate when an operator picks up a device which incorporates the digitizing tablet. Power can be saved by being supplied to other main circuits while in standby mode.

The digitizing tablet can be used as a simplified microphone. Speech from the operator to the operation panel produces sound pressure that can cause a predetermined electric signal to appear in the piezoelectric substrate since the piezoelectric substrate is exposed on the front surface of the operation panel.

Piezoelectric substrates can be fixed to two opposite sides of the input surface. Therefore, the amount of deflection caused by the input depends on the distance between the location of the input and the location of the piezoelectric substrates. The amount of deflection is transmitted to the piezoelectric substrates, and the input position is determined by comparing the outputs of the piezoelectric substrates.

The source of the vibration does not require additional space since the vibrating component of the digitizing tablets 1, 30 is either the operation panel 3 or the support substrate 4. Therefore, the size and thickness of the input device do not increase.

Furthermore, the source of the vibration does not require a support mechanism or a transmission mechanism since the vibrating component of the digitizing tablets 1, 30 is either the operation panel 3 or the support substrate 4. Therefore, there is no noise from the transmission of the vibration and no attenuation in vibration energy so that effective vibration is produced with a small drive voltage. It is not necessary to produce a continuous vibration for a certain period of time since the operator can feel the vibration when it is produced instantaneously. Therefore, the the piezoelectric substrate can be controlled by a simple circuit without an oscillator to produce a continuous vibration.

The vibration can be transmitted immediately after an input has been detected since the operation panel 3 or the support substrate 4 vibrates in response to the contractions and expansions of the piezoelectric substrate 2. The drive voltage waveform can be changed so that the operator can feel different types of vibrations.

The piezoelectric substrate 2 can be manufactured at low cost and can provide large deflections with a low drive voltage since the piezoelectric substrate 2 can be formed as a thin, single-layer structure. Therefore, vibrations of a large amplitude can be transferred to the operation panel 3 or the support substrate 4.

Additional space for housing a vibrating element is not necessary since the piezoelectric substrate is located in the space between the operation panel and the support substrate. This space also houses part of the structure of the input position detection means.

A conventional digitizing tablet can incorporate a vibrating function by fixing the piezoelectric substrate to the rear surface of the support substrate via one of the drive electrodes.

A simple drive circuit for driving the piezoelectric substrate can provide sufficiently large vibrations for the operator to sense. An oscillator circuit or the like is not required for producing continuous vibrations.

An audible sound can inform the operator that an input has been detected without having to include an additional sound source such as a loudspeaker even if the input was entered without directly touching the operation panel.

What is claimed is:

1. A digitizing tablet comprising:
   an operation panel having an input surface and a rear surface,
   a support substrate under said rear surface of said operation panel,
   an input position detector between said operation panel and said support substrate, said input position detector adapted to detect an input received via said input surface and an input position of said input and to output data regarding said input position, the input position detector comprising:
   a plurality of first electrodes arranged in parallel in a first direction;
   a plurality of second electrodes arranged in parallel in a second direction
   an expandable piezoelectric substrate;
   a pair of drive electrodes fixed to front and rear surfaces of the expandable piezoelectric substrate, the expandable piezoelectric substrate being located between first and second planes respectively defined by a front surface of the plurality of first electrodes and a rear surface of the plurality of the second electrodes and being fixed, directly or via one of said pair of drive electrodes, to said operation panel or said support substrate, and
   whereby, when an input is detected by the input position detector, the detection of the input is transmitted via vibration by a drive voltage that is applied to said pair of drive electrodes to cause said piezoelectric substrate to vibrate said operation panel or said support substrate thereby generating a feeling of said input.

2. The digitizing tablet according to claim 1, wherein said drive voltage is an output voltage appearing across a coil and is caused by an input low-voltage trigger pulse.

3. The digitizing tablet according to claim 2, wherein said drive voltage is applied at an audible band frequency to said pair of drive electrodes to expand and contract said piezoelectric substrate and thus vibrate said operation panel or said support substrate at said audible band frequency, thereby producing a sound indicative of the detection of said input.

4. The digitizing tablet according to claim 1, wherein said drive voltage is applied at an audible band frequency to said pair of drive electrodes to expand and contract said piezoelectric substrate and thus vibrate said operation panel or said support substrate at said audible band frequency, thereby producing a sound indicative of the detection of said input.

5. The digitizing tablet of claim 1, wherein the plurality of first electrodes is disposed between the rear surface of said operational panel and an insulating sheet.

6. The digitizing tablet of claim 5, wherein the plurality of second electrodes is disposed between a front surface of said support substrate and the insulating sheet.

7. The digitizing tablet of claim 1, wherein the input is detected by the piezoelectric substrate.

8. A digitizing tablet comprising,
   an operation panel having an input surface and a rear surface,
   a support substrate under said rear surface of said operation panel,
   an input position detector adapted to detect an input received via said input surface and an input position of said input and to output data regarding said input position;
   an expandable piezoelectric substrate;
   a pair of drive electrodes fixed to front and rear surfaces of the expandable piezoelectric substrate said piezoelectric substrate, being fixed to a rear surface of said support substrate, directly or via one of said pair of drive electrodes, such that the rear surface of the expandable piezoelectric substrate is unattached, and whereby, when an input is detected by the input position detector, the detection of the input is transmitted via vibration by a drive voltage that is applied to said pair of drive electrodes to cause said piezoelectric substrate to vibrate said operation panel or said support substrate thereby generating a feeling of said input.

9. The digitizing tablet according to claim 8, wherein said drive voltage is an output voltage appearing across a coil and is caused by an input low-voltage trigger pulse.

10. The digitizing tablet according to claim 9, wherein said drive voltage is applied at an audible band frequency to said pair of drive electrodes to expand and contract said piezoelectric substrate and thus vibrate said operation panel or said support substrate at said audible band frequency, thereby producing a sound indicative of the detection of said input.

11. The digitizing tablet according to claim 8, wherein said drive voltage is applied at an audible band frequency to said pair of drive electrodes to expand and contract said piezoelectric substrate and thus vibrate said operation panel or said support substrate at said audible band frequency, thereby producing a sound indicative of the detection of said input.

12. The digitizing tablet of claim 8, wherein the plurality of first electrodes is disposed between the rear surface of said operational panel and an insulating sheet.

13. The digitizing tablet of claim 12, wherein the plurality of second electrodes is disposed between a front surface of said support substrate and the insulating sheet.

14. The digitizing tablet of claim 8, wherein the input is detected by the piezoelectric substrate.

15. A digitizing tablet comprising:
an operation panel having an input surface and a rear surface,
a support substrate under said rear surface of said operation panel,
an input position detector between said operation panel and said support substrate, said input position detector adapted to detect an input received via said input surface and an input position of said input and to output data regarding said input position, the input position detector comprising:
a plurality of first electrodes arranged in parallel in a first direction;
a plurality of second electrodes arranged in parallel in a second direction,
an expandable piezoelectric substrate having a front surface and rear surface, the expandable piezoelectric substrate being fixed to one of the group consisting of (1) the rear surface of the operation panel such that the front surface of the piezoelectric substrate is coplanar with a front surface of the plurality of first electrodes, and (2) the front surface of the support substrate such that the rear surface of the piezoelectric substrate is coplanar with a rear surface of the plurality of second electrodes;
a pair of drive electrodes fixed to the front and rear surfaces of the expandable piezoelectric substrate;
whereby, when an input is detected by the input position detector, the detection of the input is transmitted via vibration by a drive voltage that is applied to said pair of drive electrodes to cause said piezoelectric substrate to vibrate said operation panel or said support substrate thereby generating a feeling of said input.

16. The digitizing tablet according to claim 15, wherein said drive voltage is an output voltage appearing across a coil and is caused by an input low-voltage trigger pulse.

17. The digitizing tablet according to claim 16, wherein said drive voltage is applied at an audible band frequency to said pair of drive electrodes to expand and contract said piezoelectric substrate and thus vibrate said operation panel or said support substrate at said audible band frequency, thereby producing a sound indicative of the detection of said input.

18. The digitizing tablet according to claim 15, wherein said drive voltage is applied at an audible band frequency to said pair of drive electrodes to expand and contract said piezoelectric substrate and thus vibrate said operation panel or said support substrate at said audible band frequency, thereby producing a sound indicative of the detection of said input.

19. The digitizing tablet of claim 15, wherein the plurality of first electrodes is disposed between the rear surface of said operational panel and an insulating sheet.

20. The digitizing tablet of claim 19, wherein the plurality of second electrodes is disposed between a front surface of said support substrate and the insulating sheet.

21. The digitizing tablet of claim 15, wherein the input is detected by the piezoelectric substrate.

* * * * *